(12) United States Patent
Johnson

(10) Patent No.: US 6,505,746 B1
(45) Date of Patent: Jan. 14, 2003

(54) MULTIPLE UTENSIL REST PROVIDING PREVENTION OF FOOD COMMINGLING

(76) Inventor: Annette P. Johnson, 1085 Harmony Rd., Downingtown, PA (US) 19335

( * ) Notice: Subject to any disclaimer, the term of this patent is extended or adjusted under 35 U.S.C. 154(b) by 0 days.

(21) Appl. No.: 09/854,441

(22) Filed: May 14, 2001

(51) Int. Cl.$^7$ .................................................. A47F 7/00
(52) U.S. Cl. ..................................... 211/70.7; 248/37.3
(58) Field of Search ................. 211/70.7, 62; 248/37.3; D7/637, 638, 639, 640, 641

(56) References Cited

U.S. PATENT DOCUMENTS

| | | | |
|---|---|---|---|
| 277,304 A | 5/1883 | Maeder | 65/65 |
| D44,485 S | 8/1913 | McNair | 65/65 |
| 1,182,732 A | 5/1916 | Avery | 65/65 |
| 1,472,995 A | 4/1923 | Simone | 65/65 |
| 2,286,012 A | * 6/1942 | Rochow | 248/37.6 |
| 2,483,724 A | 10/1949 | Butler | 65/65 |
| D177,478 S | 4/1956 | Marchion | D44/29 |
| D274,684 S | 7/1984 | Norton | D7/73 |
| D331,671 S | * 12/1992 | Adams | D6/416 |
| 5,285,906 A | * 2/1994 | Wisnowski et al. | 211/62 |
| 5,396,993 A | * 3/1995 | Spitler | 211/70.7 |
| D378,564 S | 3/1997 | Hall | D7/637 |
| D394,370 S | 5/1998 | Hollinger | D7/637 |
| D397,000 S | 8/1998 | Goodman et al. | D7/637 |
| D419,018 S | * 1/2000 | Jeynes | D6/534 |
| D419,395 S | 1/2000 | Swanson | D7/637 |
| D433,287 S | 11/2000 | Goodman et al. | D7/640 |

* cited by examiner

Primary Examiner—Robert W. Gibson, Jr.
Assistant Examiner—Erica B Harris

(57) ABSTRACT

A multiple cooking utensil rest which includes a base with a recess therein for receiving a container. The container is provided with a grate allowing for drainage and support for the lower portion of utensils. Preferably the grate and the container are removable from the base for ease of cleaning. The upper portion of the utensils is supported by an elongated "C" shaped member, horizontally positioned and mounted to an upper end of vertical supports mounted to the base, providing upright positioning for multiple utensils during food preparation.

11 Claims, 3 Drawing Sheets

MULTIPLE UTENSIL REST PROVIDING PREVENTION OF FOOD COMMINGLING

FIELD OF THE INVENTION

The present invention is directed to a utensil rest. More particularly, the present invention is related to a utensil rest which may be simultaneously utilized for multiple utensils and which is easily cleanable.

BACKGROUND OF THE INVENTION

During the process of cooking, utensils, which may be utilized for mixing or otherwise preparing foods, need to be temporarily stored between mixing or other working operations performed on the food. Preferably, these are not merely laid on counter tops or on the stove. It is often undesirable to leave the cooking utensil in the cooking pot or other container for various reasons, including the utensil becoming overheated and the inability to place a cover or lid on the cooking pot or container. There is also a need for providing a means for the temporary storage of a plurality of cooking utensils which may be dripping with different foods from different cooking containers. If these are temporarily placed in a bowl or other single container, the different food fluids may become admixed resulting in the undesirable result of foreign foods being placed in the cooking container when the temporarily stored cooking utensil is again utilized for stirring or the like.

SUMMARY OF THE INVENTION

One advantage of the present invention is that it may be simultaneously utilized with a plurality of different cooking utensils without admixing food fluids from different utensils.

Another advantage of the present invention is that it provides a temporary storage or utensil rest which occupies a minimum amount of counter space even though a plurality of cooking utensils are temporarily stored thereon.

Another advantage of the present invention is that it may be readily cleaned in its entirety periodically. Further, the container which collects the fluids and the grate through which the fluids pass may be cleaned easily after each use by easily removing the grate and container and placing it in a dishwasher or using other convenient cleaning means.

Briefly and basically, in accordance with the present invention, a utensil rest is provided which includes a base with a recess formed in the base. A container is provided which is removably placed in the recess formed in the base. The container is provided with a grate which is removably seated on top of the container. A substantially vertical support comprised of at least a single post is mounted to the base. An elongated member is horizontally positioned and mounted to an upper portion of the vertical support. The elongated member is provided with retention elements at each end. In this manner, one or more cooking utensils, each having a handle portion and a food working portion, may be positioned such that the food working portion of the utensil rests on the grate and any food thereon may drain through the grate into the container. The handle portion of the utensils may rest against the horizontally positioned member with its retaining elements.

In a presently preferred embodiment, the horizontally positioned elongated member with its retaining elements at each end may be in the form of an elongated "C" shaped member.

BRIEF DESCRIPTION OF THE DRAWINGS

For the purpose of illustrating the invention, there is, shown in the drawings, forms which are presently preferred. It being understood, however, that this invention is not limited to the precise arrangements and instrumentalities shown.

DETAILED DESCRIPTION OF THE PREFERRED EMBODIMENTS

Figure 1:
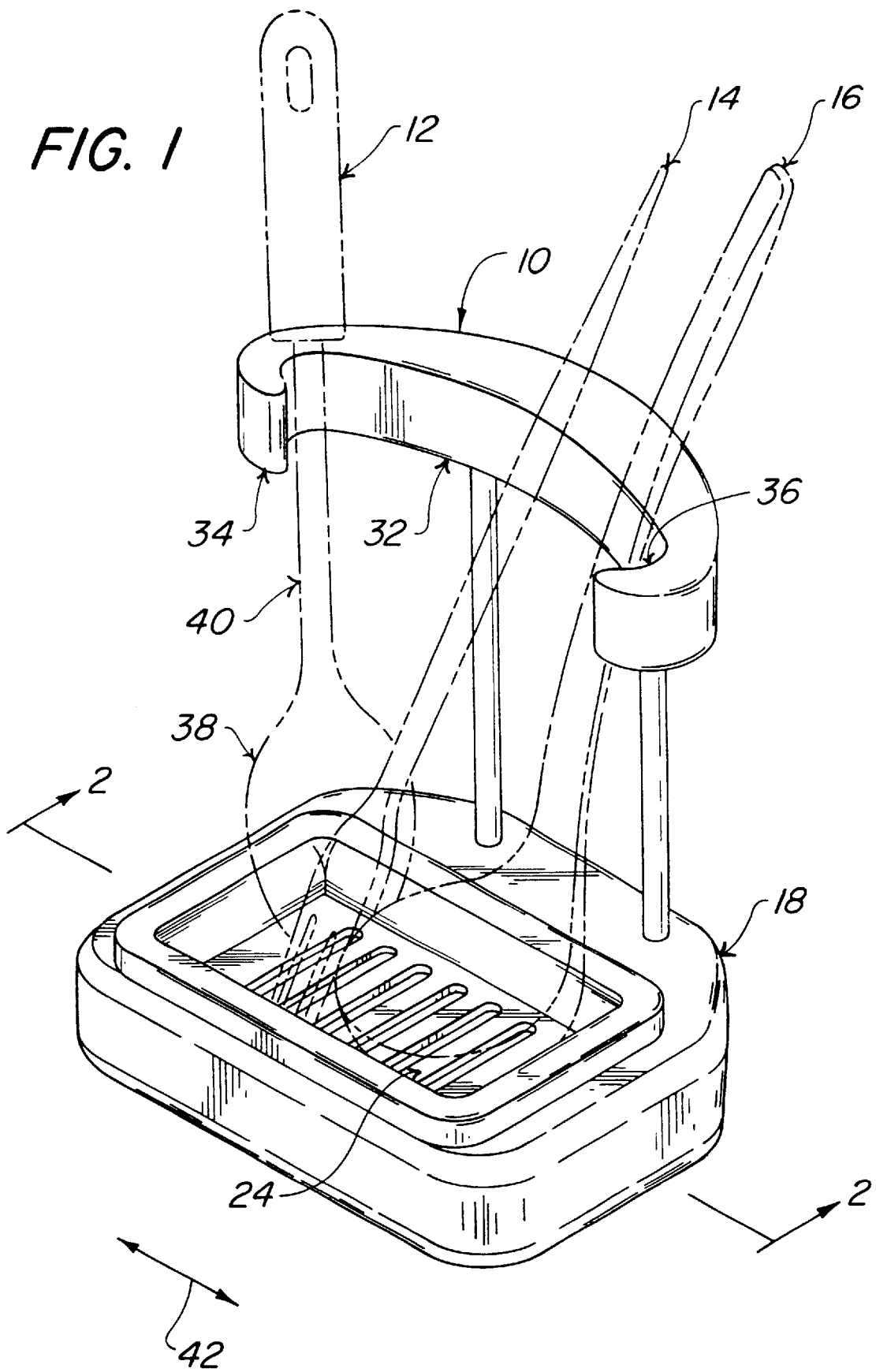
FIG. 1 is a view in perspective of an embodiment of the present invention with utensils shown in dotted outline form.

Referring now to the drawings, wherein like numerals indicate like elements, there is shown in FIG. 1 a device or utensil rest 10 for multiple utensils 12, 14 and 16 shown in dotted outline form. It is understood that utensil rest 10 may be utilized in connection with a single utensil or that any reasonable number of utensils may be positioned on utensil rest 10, such as anywhere between one and five. Even more than five may be positioned thereon, especially if utensil rest 10 were more elongated and as discussed hereinafter, but in most applications, utensil rest 10 would preferably be designed to accommodate a maximum of about five utensils.

Figure 2:
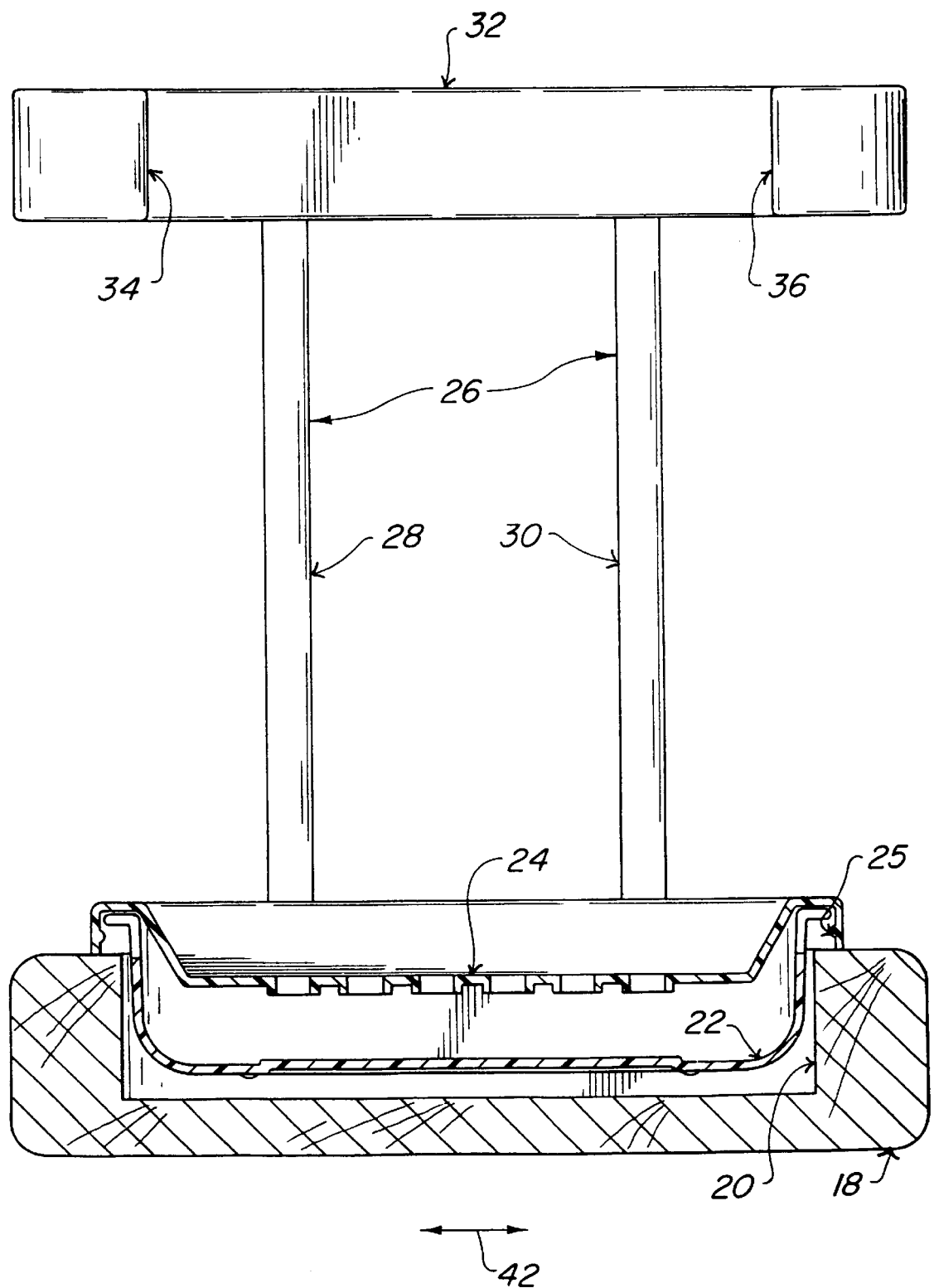
FIG. 2 is a cross sectional view taken along line 2—2 of FIG. 1.

Utensil rest 10 includes a base 18 with a recess 20 formed therein as may be best seen in FIG. 2. Container 22, best seen in FIG. 2, is adapted to be removably placed in recess 20 formed in base 18. Container 22 is provided with a grate 24 which is adapted to be removably seated on top of container 22. Grate 24 may be in the form of a cover which releasibly snaps onto container 22, being held by projections 25. This may provide the advantage of the container and grate being removable from base 18 as a unit. However, any suitable arrangement of providing a removable container in a recess in a base with a grate positioned thereover is contemplated to be within the scope of the present invention.

Grate 24 may have any suitable arrangement of supporting surface with holes therein allowing passage of food dripping from the utensils. As illustrated in the presently preferred embodiment, these are elongated holes between elongated grate elements. However, it is understood that any suitable shape of grating may be utilized, including a grid shape and the size of the openings may vary so long as they are sufficiently close together to prevent the utensils from passing through.

A substantially vertical support 26 is adapted to be mounted to base 18. In a presently preferred embodiment, substantially vertical support 26 may be comprised of two posts 28 and 30. However, it is understood that a single vertical support may be utilized or three or more posts or vertical supports may be utilized. It is understood throughout that any reference to a vertical support or post means substantially vertical, and it is expressly noted that substantially vertical support 26 may be provided with slight deviations from the vertical, and particularly slight deviations in a rearward direction or in a direction away from the grate. However, in a presently preferred embodiment, vertical supports 26 may be vertical or very close to vertical.

Figure 3:
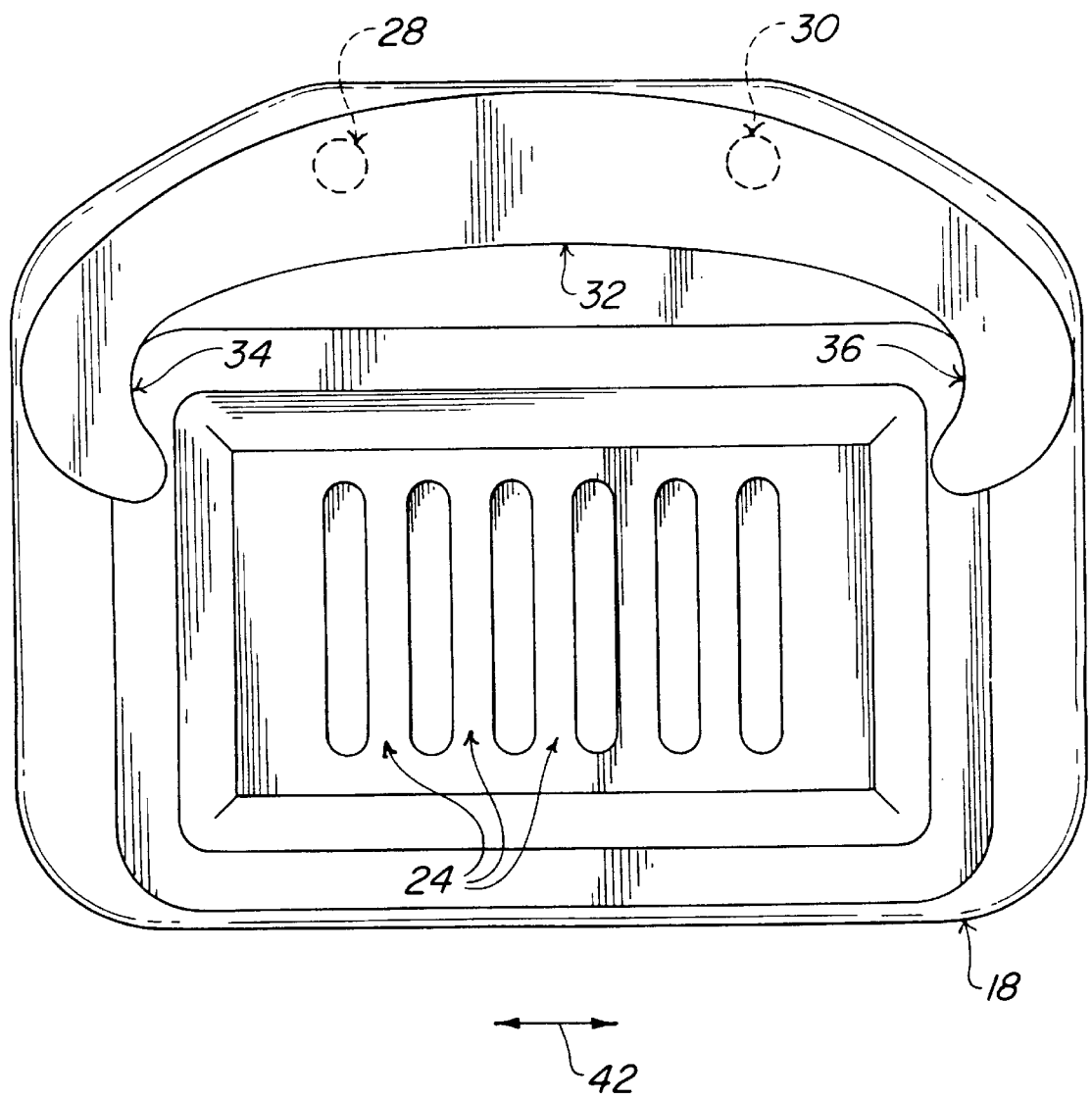
FIG. 3 is a top plan view of the embodiment of FIG. 1.

Further shown in FIGS. 1, 2 and 3, is an elongated member 32 which is horizontally positioned and mounted to an upper portion of vertical support 26. In a presently preferred embodiment, elongated member 32 is mounted to the upper ends of vertical support posts 28 and 30. Elongated member 32 is provided with retaining elements 34 and 36 at its ends. Retaining elements 34 and 36 formed on the ends of elongated member 32 are utilized to prevent utensils, such as utensils 12, 14 and 16, from sliding laterally along elongated member 32 and falling off. In a presently preferred embodiment, the horizontally positioned elongated member with the retaining elements would be in the form of an elongated "C." However, it is understood that various forms and shapes of the elongated member may be utilized in practicing the present invention, including, but not limited to, a substantially rectilinear bracket shaped horizontally positioned member.

In accordance with the present invention, one or more cooking utensils, each having a food working portion, such as the spoon portion 38 of utensil 12 and the remainder portion of the utensil herein being referred to as a handle portion, such as handle portion 40 of utensil 12. During the cooking operation, the food working portion of the utensil may be placed on grate 24 wherein any food on the food working portion of the utensil may drain through the grate 24 into container 22. The handle portion of the utensil may rest against the elongated horizontally positioned member with its retaining elements, which in the presently preferred embodiment would be the elongated "C" shaped member 32 with end portions 34 and 36 of the elongated "C" shaped member. As may be best seen in FIGS. 1 and 3, the elongated horizontally positioned member preferably has a slightly outwardly curved shape, that is in the form of an elongated "C" shape.

In practicing the present invention, the utensil rest of the present invention may be made of any suitable material. Preferably, utensil rest 10 of the present invention is made of a material which is sufficiently rigid and cleanable. The utensil rest of the present invention may be made of any suitable material. It may be constructed of plastic which has thermal properties which would enable it to be cleaned in a dishwasher and would not incur any melting or deformity as a result of hot utensils. Utensil rest 10 may be made of stainless steel, chrome plated metal, aluminum or other suitable metal. Utensil rest 10 may also be made of wood, or again, any other suitable material. Preferably, utensil rest 10, or at least base 18, is preferably comprised of a material which provides sufficient weight to make utensil rest 10 stable and not subject to tipping.

As illustrated in FIGS. 1, 2 and 3, grate 24 is preferably elongated in the direction of elongation of elongated member 32 thereby more readily enabling the simultaneous use of utensil rest 10 for a plurality of cooking utensils. Although not required, it is preferable that the elongated grate also be provided with an elongated container 22, elongated in the same direction, that is the direction of elongation of elongated member 32 as shown by double headed arrow 42. Although the base may have any suitable shape, including round or square, it is preferable, primarily for aesthetic purposes, that base 18 also be elongated in the direction of elongation of elongated member 32, that is in the direction of double headed arrow 42.

The present invention may be embodied in other specific forms without departing from the spirit or essential attributes thereof and, accordingly, reference should be made to the appended claims, rather than to the foregoing specification as indicating the scope of the invention.

I claim:

1. A device comprising:

a base with a recess formed in said base;

a container removably mounted within said recess formed in said base;

a grate removably mounted on top of said container by a snap-fit engagement between said grate and said top of said container;

a substantially vertical support comprised of at least one post mounted to said base; and an elongated member horizontally positioned and mounted to an upper end of said vertical support, said elongated member being provided with retaining elements at each end;

whereby one or more cooking utensils, each having a handle portion and a food working portion, may be positioned such that the food working portion of such utensil rests on said gate and any food thereon may drain through said grate into said container, and such handle portion of such utensil may rest against said horizontally positioned elongated member.

2. A device in accordance with claim 1 wherein said elongated member with its retaining elements at each end is in the shape of an elongated "C" shaped member.

3. A device in accordance with claim 2 wherein said grate is elongated in the same direction as the elongation of said elongated "C" shaped member.

4. A device in accordance with claim 2 wherein said grate and said container are elongated in the same direction as the elongation of said elongated "C" shaped member.

5. A device in accordance with claim 2 wherein said base is elongated in the same direction as the elongation of said elongated "C" shaped member.

6. A device in accordance with claim 1 wherein said vertical support is comprised of at least two posts.

7. A device in accordance with claim 1 wherein said grate is elongated in the same direction as the elongation of said elongated member.

8. A device in accordance with claim 1 wherein said grate and said container are elongated in the same direction as the elongation of said elongated member.

9. A device in accordance with claim 1 wherein said base is elongated in the same direction as the elongation of said elongated shaped member.

10. A device in accordance with claim 1 wherein said device is comprised of plastic.

11. A device in accordance with claim 1 wherein said device is comprised of stainless steel.

* * * * *